United States Patent [19]
Palmason

[11] 3,839,951
[45] Oct. 8, 1974

[54] APPARATUS FOR COOKING COMESTIBLES

[75] Inventor: Einar H. Palmason, Fort Lauderdale, Fla.

[73] Assignee: Parkson Industrial Equipment Company, Fort Lauderdale, Fla.

[22] Filed: June 20, 1973

[21] Appl. No.: 371,851

Related U.S. Application Data

[62] Division of Ser. No. 748,743, July 30, 1968, Pat. No. 3,787,594.

[52] U.S. Cl.................... 99/330, 99/331, 99/337, 99/408, 99/411, 99/416
[51] Int. Cl. .......................................... A47j 37/12
[58] Field of Search ............ 99/403, 408, 411, 416, 99/330, 331, 337, 342, 238, 438; 210/DIG. 8; 126/359

[56] References Cited
UNITED STATES PATENTS

| | | | |
|---|---|---|---|
| 2,177,193 | 10/1939 | Watts | 99/416 X |
| 2,287,396 | 6/1942 | Roth | 99/408 X |
| 2,578,129 | 12/1951 | Daugherty | 99/408 |
| 2,767,095 | 10/1956 | Smith | 426/438 |
| 2,886,439 | 5/1959 | Eytinge | 426/238 |
| 3,210,193 | 10/1965 | Martin | 99/408 X |
| 3,263,596 | 8/1966 | Thomas | 99/408 |
| 3,431,835 | 3/1969 | Angold | 99/408 |
| 3,512,473 | 5/1970 | Moore et al. | 99/411 X |

Primary Examiner—Billy J. Wilhite
Attorney, Agent, or Firm—Brumbaugh, Graves, Donohue & Raymond

[57] ABSTRACT

A method and apparatus for deep-fat cooking of comestibles in which the comestibles are immersed in a bath of a hot cooking medium maintained in a cooking vessel in which the heated medium is being continuously changed while cooking is taking place by flowing the heated medium into the bath and through and around the comestibles, overflowing it from the surface of the bath into a heating reservoir and reheating and recirculating it in a manner so as to sweep from the bath loose particles of comestibles so as to maintain the bath at the required cooking temperature. The overflow of the heated medium is filtered to remove the loose particles of comestibles before the medium is reheated and returned to the bath, and a small quantity of the oil is continuously drained from the cooking vessel during cooking operation and completely drained from the vessel when the cooking operation is stopped so as to return the cooking medium to the heating reservoir.

23 Claims, 6 Drawing Figures

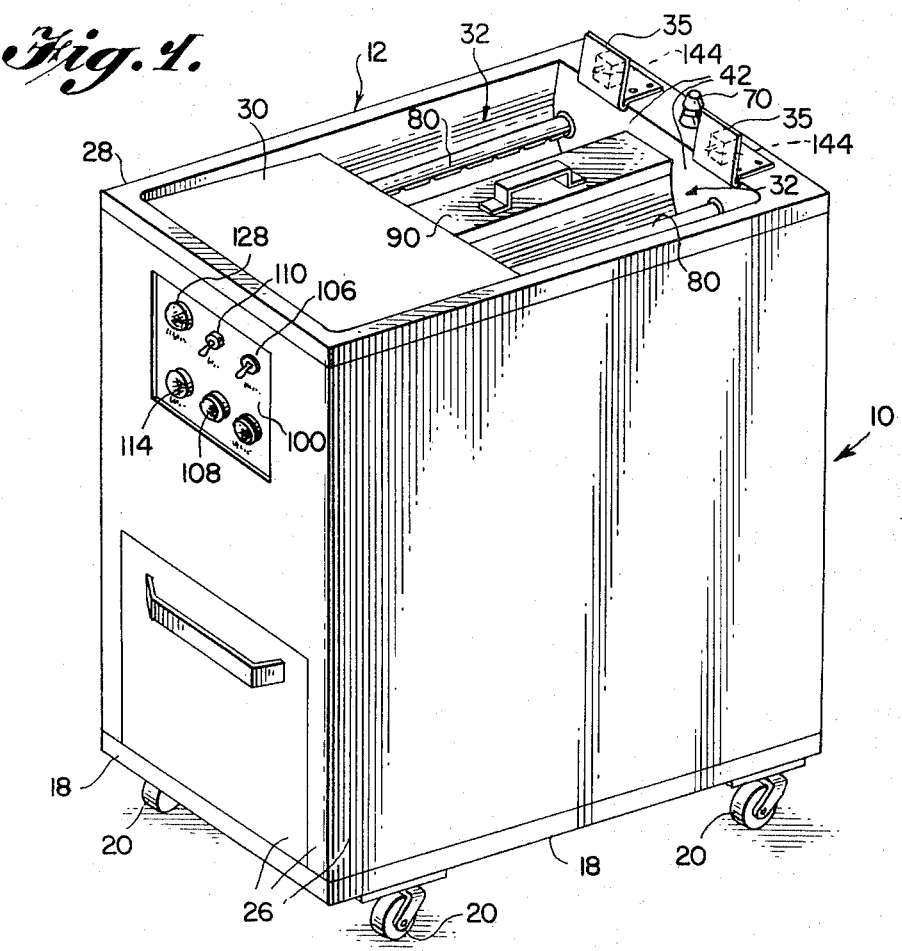
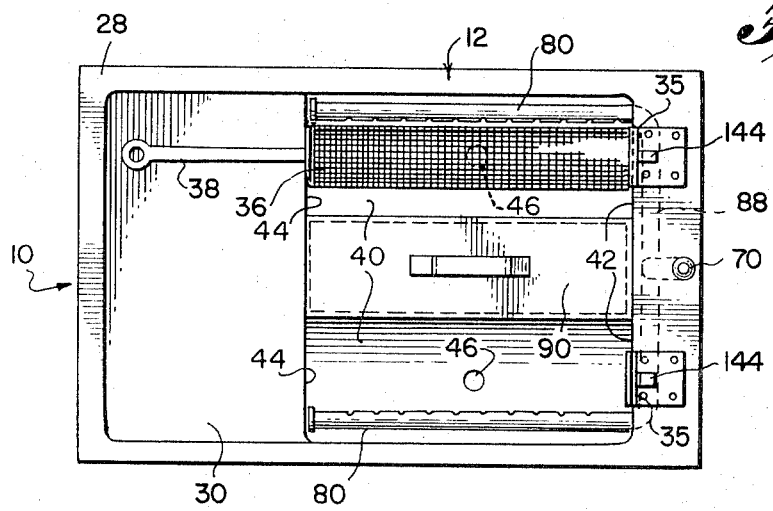

APPARATUS FOR COOKING COMESTIBLES

This application is a divisional application Ser. No. 748,743 which issued as U.S. Pat. No. 3,787,594 on Jan. 22, 1974.

This invention is in the field of art that covers the cooking of comestibles which is classified in the U.S. Pat. Office in Class 99.

This invention relates to "deep-fat" cooking of comestibles and more particularly to an improved apparatus for preparing food products in a heated bath of a cooking medium contained in a vessel in which the medium is continuously circulated during cooking by overflowing a portion of it from the bath, the overflow filtered to remove loose, free particles of comestibles to prevent them from remaining in the vessel and the filtered cooking medium heated and returned to the vessel to maintain the bath at substantially constant temperature and free of loose charred particles of comestibles.

Many methods have been proposed for the cooking of food products by immersing them in a hot cooking medium. One such method is shown in the patent to Martin, U.S. Pat. No. 3,210,193, in which hot cooking oil maintained at a temperature substantially higher than the desired cooking temperature is intermittently pumped into a cooking vessel while an equal amount of oil is removed from the bottom of the vessel, so that the temperature of the oil in the cooking vessel is always higher than the desired cooking temperature. Another method is shown in the patent to Smith, U.S. Pat. No. 2,767,095, in which the comestibles are cooked in a body of heated liquid in an open atmosphere where the liquid dissolves substantial quantities of air. The liquid is continuously withdrawn from the system, heated, and the air removed from the liquid before returning the liquid to the system.

In the prior art methods, where an effort is made to improve the cooking rate by flushing hot oil over and around the articles being cooked, it is general practice to withdraw the oil from the cooking vessel which is at atmospheric pressure and force it through a heating vessel or a storage vessel which is always maintained full of oil or fat and therefore under a pressure higher than that of the cooking vessel. As a result, when fat or oil is absorbed by the food being cooked, the level of fat or oil drops in the cooking vessel thus preventing any skimming or removal of loose particles from the surface of the hot fat or oil in the cooking compartment. These loose particles generally float on the surface of the hot fat or oil at least until the contained moisture has been driven off and the particle is essentially charred when it then sinks to the bottom of the vessel.

If an attempt is made to filter this objectionable and probably harmful material from the cooking medium, it must be withdrawn from the bottom of the vessel and either sucked or pumped through a filter. The filter is therefore under the pressure of a head of the medium or pressure from the pump. Accumulation in the filter cannot be seen and it becomes difficult to clean the filter without interrupting the flow of the cooking medium and it is difficult to determine when the filter needs cleaning.

No attempt previously has been made to remove from the surface of a bath of hot cooking medium loose particles of comestibles before they have substantially charred so as to reduce the formation of harmful benzopyrenes, as well as to prevent foreign tastes and odors that accumulate in cooking oil and fat causing darkening and damage, particularly where more than one type of food product is cooked in it, and where the food being cooked is drenched in corn meal or batter or crumbs.

I have found that an excellent food product is produced by the rapid cooking as set forth in my invention, which food product has relatively low fat or oil absorption and a high degree of crispness. This is achieved by cooking in a vessel or isolated portion of a vessel having a bath of heated cooking medium, such as cooking oil or fat, that is continuously circulated through the food as it is cooked in a manner so that the loose particles of the food present in the cooking medium are swept out of the bath by continuous overflow of the cooking medium from the bath. The overflow of cooking medium is filtered to remove the loose food particles entrained therein before it is heated and returned to the cooking vessel. Also the condition of the filter may be easily seen and thus may be cleaned, automatically or manually, without interrupting the operation of the cooker whenever large amounts of loose particles of comestibles have been collected in it. The filter, when exposed, may be lifted out and cleaned or replaced anytime it is found to be full of particles. In the case when the filter has a raised cover over it, when the filter is filled it retards the flow of oil so that the level of oil in the cooking vessels will begin to rise. This automatically drops the level of oil in a reservoir which causes a float switch to disconnect a pump motor and flashes a signal light to "change filter."

This invention presents an advance in the art of cooking by "deep-fat" immersion of comestibles retained in a suitable flow-through cooking basket positioned in a cooking vessel having in it a hot cooking medium. The cooking medium is continuously pumped into the bath, circulated through the food in the cooking basket, and overflowed from the cooking vessel and into a screen or filter, all during the cooking cycle of the comestibles. AS the cooking medium passes through the basket, it picks up or sweeps particles of the food or crumbs which break loose or fall away from the comestible, carrying them out of the cooking basket into the oil bath. The rate of oil flow and the shape of the cooking vessel cause these loose particles to be swept from the vessel into a filter or screen, thus cleaning the exiting oil and preventing the particles from becoming charrred by remaining in the hot oil. It will be appreciated that the overflowing cooking medium is then at its lowest temperature, having given up heat to the food being cooked, and is then cleaned and reheated.

Thus there is provided an effective clearing of the cooking medium by the overflow of particles of comestible that adversely affects the taste of the cooked product if they are allowed to remain in the cooking medium and become charred.

In using my invention, the food particles detached from the comestible being cooked, such as crumbs from "breaded" articles or small pieces of food, do not remain in the cooking bath where they can be charred by overcooking which can produce in the bath the undesirable chemicals that may be harmful if consumed. The cooking medium is thereby maintained in a fresher condition free of odors and appreciably unaffected in taste qualities. Also, because of the rapid flow of cooking medium into the cooking vessel or chamber, a heat insulating layer of cooled cooking medium does not build up on the food being cooked. Food is therefore more rapidly cooked and absorbs and carries with it less cooking medium so it has a lower fat or oil content when taken from the cooking bath which provides for a tastier cooked food product having a lower caloric value, and having increased appeal to the consumer. In addition, steam present in the medium is removed with the overflow so it can pass off to the atmosphere and is not absorbed into nor does it cling to the food product where it can recondense as water and destroy the crispness of the cooked food.

This invention utilizes a cooking tray or table that has one or more deep well cooking vessels or receptacles in it, filled with a moving hot cooking oil with a surface overflow means and a means for introducing heated cooking medium to produce a flow directed so as to clean the cooking vessel and cause a continuous changing of the cooking medium in the vessel during cooking. The surface overflow means and the means for introducing the hot cooking medium are spaced apart so that the medium being introduced into a vessel is swept through and around comestibles immersed in it thus cooking them and conveying off these loose particles by way of the overflow to prevent their charring and remaining in the vessel. This flow of the hot cooking medium over the overflow means is then passed through a filtering or screening means where the particles are removed, the cooking medium then flowing by gravity to a heating area and to a pump that returns it heated to the vessels. The food thus cooked by this invention is substantially free of odor and in particular the equipment is capable of cooking many types of foods in the same medium without one having the taste of the other. For example, fish and potatoes can be cooked in the same medium with each maintaining its individual taste without any taste contamination from the other.

Advantageously, the method of cooking comestibles of this invention can be carried out in a portable cooking unit in which a plurality of deep well cooking vessels or receptacles may be used, with each vessel having a weir or spillway connected to it over which hot cooking medium such as oil or fat overflows. In such a system, the hot oil is introduced at the desired cooking temperature through a distributor means in the vessel with the oil being directed downwardly and outwardly into the interior of the vessels so as to sweep through comestibles immersed in it causing turbulence to lift loose food particles to the surface and then overflow them from the vessels. The overflowing oil carries the loose particles of comestibles that have broken away from those in the cooking baskets and these particles are left in the screen or filter before the filtered oil is passed to a reservoir where it is heated and then returned by pumping to the distributors positioned in the vessels.

Thus, by providing a circulating system in which a supply of cooking oil is pumped from a reservoir containing oil under atmospheric pressure, through oil heaters to maintain the oil at the desired cooking temperature and then into oil distributors for sweeping the oil through comestibles immersed in it with a quantity of oil being introduced that will provide a constant overflow, there is provided a "deep-fat" frying system that will effect the frying of foods crisply and evenly throughout while maintaining fresh taste and aroma and be devoid of the taste of other foods that may be cooked in the oil.

Advantageously, the cooking oil reservoir in the form of a supply tank can be arranged so that the filtered oil flowing from the overflow means enters it above the maintained level in the tank thus providing for release of steam or entrained air that may affect the oil circulation. A vent means may be provided to release this air or steam so that there is little or no accumulation in the reservoir and assure continuous functioning of the apparatus without steam or air locks.

It will be appreciated that venting the oil reservoir maintains it at atmospheric pressure similar to the pressure maintained in the cooking vessel. The oil in the reservoir is also maintained at substantially the selected cooking temperature by the heaters in the tank. Because the oil flowing through and around the piece of comestible prevents an envelope of cool, insulating oil from coating the cold comestible when it is first immersed in the hot bath, the cooking time is thus shortened as compared to normal "deep-fat" fryers which use convection to circulate the cooking oil; therefore, the temperature of the oil in the system of my invention can be kept lower than the cooking oil temperature used in convection type "deep-fat" frying units.

Another apparatus and method of operating by this invention is particularly advantageous when only a small or intermittent output is required from the "deep-fat" fryer. Here, the oil overflow from the cooking vessel flows by gravity into the reservoir where it is maintained at cooking temperature. The bottom of the cooking vessel has a small drain means that bleeds off a constant stream of the oil through a small filter screen and and passes it to the reservoir. When the cooking operation is stopped, the oil in the vessel passes into the reservoir where it is heated and retained ready for use. Also where fat is used as the cooking medium that solidifies under cooling temperature conditions, the draining of the hot fat from the vessels into the reservoir as soon as the pump has been shut off prevents it from solidifying in the cooking vessel.

It will be appreciated that in the cooking system of my invention when a switch is activated, usually by means of lifting a cooking basket from a hanger bracket support, the pump starts and immediately brings hot cooking medium into the cooking vessels where it goes around and through the comestible and overflows a lower side in the cooking vessels, then through a screen or filter, and back into a reservoir which may also be a heating section. The system and apparatus of this invention has the advantage of keeping cooking oil or fat all in one reservoir, held substantially at the cooking temperature, and it limits the amount of exposure of hot oil or fat to the air as is necessary during the overflow filtration to prevent oxidation of the oil or fat. Also it has been found that by the use of a positive displacement oil delivery pump, heated oil is effectively and continuously delivered during the cooking operation and particularly for that type of cooking operation where quick starting and stopping is desired. Additional objects and advantages of the invention will be more fully appreciated by reference to the accompanying drawings and a description of them which are illustrative of a preferred embodiment of the inventive concepts herein, in which:

FIG. 1 is a view in perspective of a portable "deep-fat" frying unit embodying my invention showing two cooking vessels separated by an overflow means for producing an overflowing of hot cooking oil when the oil is circulated during cooking;

FIG. 2 is a top plan view of the unit shown in FIG. 1 showing the relationship of the hot oil distributors positioned in the vessels for circulating the oil and the overflow device for the removal of the oil from the cooking vessels;

Figure 3:
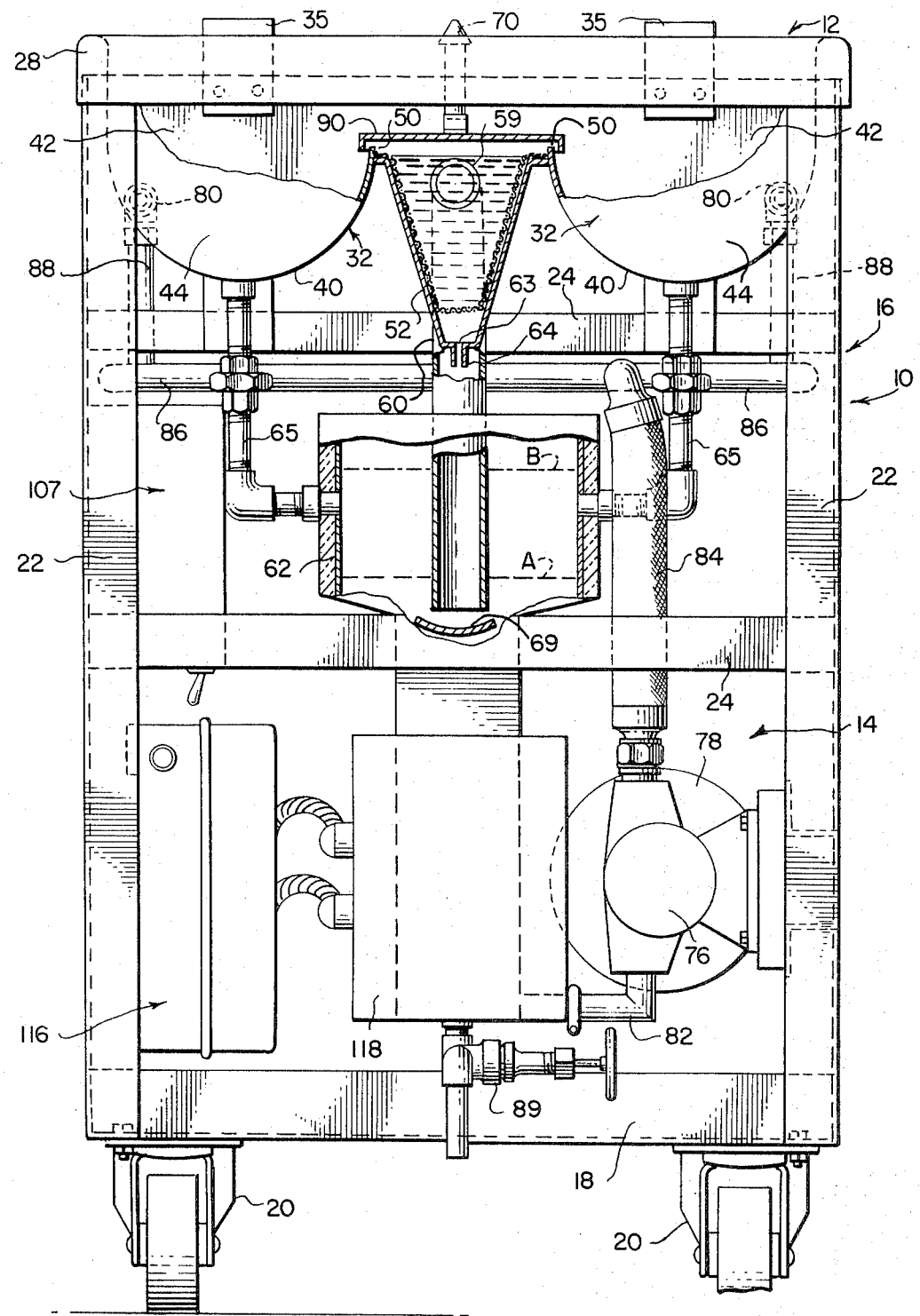
FIG. 3 is a front view in elevation of the frying unit of FIG. 1 with a portion of it broken away to show the relationship of the cooking vessels, the overflow device and filter, the reservoir and the pump that circulates the heated oil through the unit.
Figure 4:
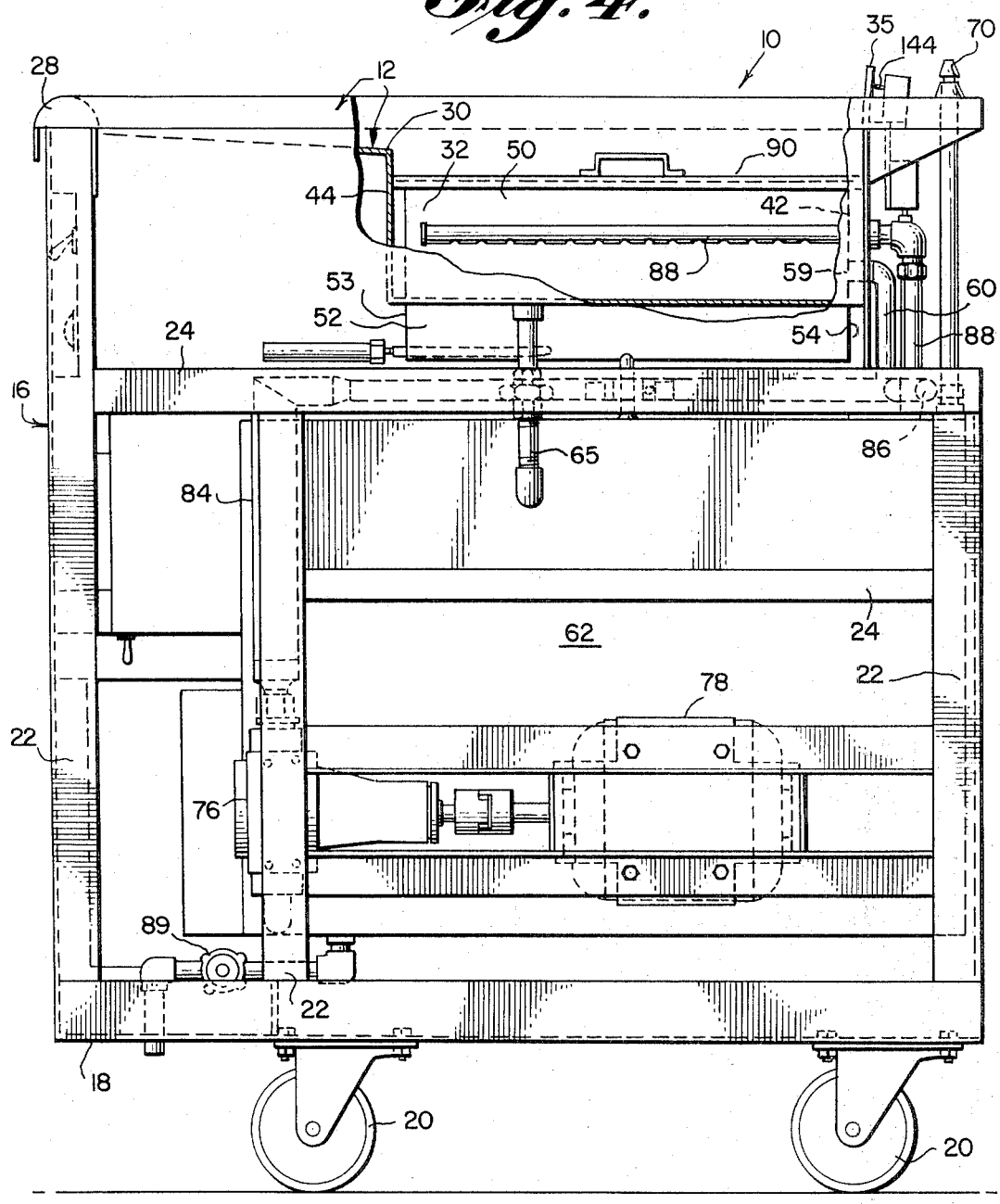
FIG. 4 is a side view in elevation of the frying unit of FIG. 1 with a portion of it broken away to show the tray for holding the cooking vessels, the cooking vessels in relation to the overflow device and the distributors for the circulating of heated cooking oil.
Figure 5:
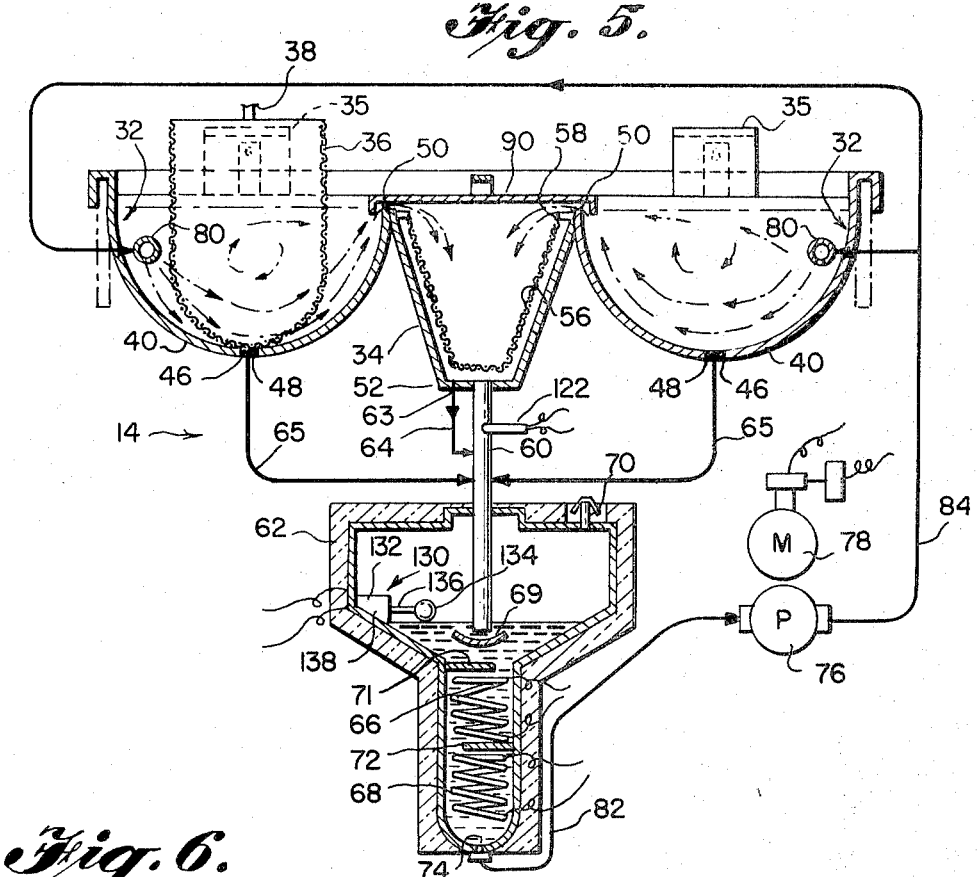
Figure 6:
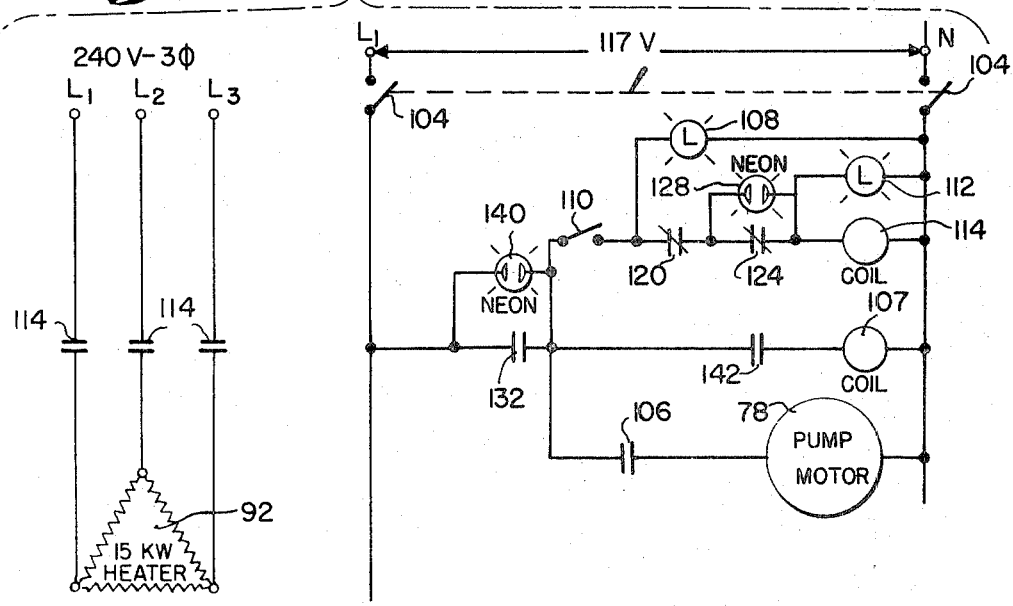

FIG. 5 is a schematic representation of the unit shown in FIGS. 1, 3 and 4 illustrating the ingress of hot cooking oil through distributors into the cooking vessels, the typical flow of the oil in and through the vessels, the overflowing of the oil through a filtering device to the reservoir, and the pump means for returning the oil to the distributors after it has been heated; and FIG. 6 is a wiring diagram showing the control system for starting and stopping the operation of the apparatus.

In the drawings, numeral 10 represents the "deep-fat" frying unit or device of this invention for cooking comestibles by immersion in a hot cooking medium such as oil or fat. The device has a cooking tray 12 made preferably or stainless steel that provides a cooking work area. Located below the work area is a cooking oil storage, heating and circulating system 14 which provides a reserve of hot oil which it maintains at a substantially constant cooking temperature and circulates to the cooking vessels when comestibles immersed in the cooking oil are being cooked. Supporting the cooking tray 12 is a structural frame 16 having a supporting base 18 to which casters 20 are attached to make the unit portable in those cases where portability of the "deep-fat" frying unit of this invention is desired. The structural frame has upright framing members 22 and cross framing members 24 for support of the cooking tray unit and the associated storage, heating and circulating system. Front, rear, and side panels 26 are attached to the framing members to enclose the "deep-fat" frying device.

The cooking tray 12 is an integrally formed structure having a beaded outer edge 28 that surrounds the periphery of the cooking tray and encloses a sloping oil drainage shelf 30, and a pair of spaced cooking vessels or receptacles 32 which are separated by a cooking oil overflow device 34. In line with the cooking vessels and on the back upper surface of the cooking tray are a pair of hanger bracket supports 35 for respectively supporting one of a pair of "deep-fat" cooking or frying baskets 36 out of the oil so that they can rest above or drain into the vessels when cooking is not taking place. The baskets have a rounded bottom configuration and are adapted to fit into one of the cooking receptacles for immersion cooking of the comestibles placed in the baskets. The baskets are of a height so that when resting on the bottom of the vessels during cooking the upper rim of a basket is above the cooking oil level in the vessel. The baskets also have a handle 38 by which they are easily manipulated (See FIGS. 2 and 5).

The cooking vessels 32 are elongated troughs each having a semi-cylindrical bottom portion 40, rear end wall 42, and a front end wall 44. The semi-cylindrical bottom portion at the outboard side extends upwardly to the beaded outer edge 28 while the inboard side extends upwardly to join the overflow device 34. The rear end wall 42 extends upwardly from the bottom of each vessel to the beaded outer edge 28, and the front wall 44 of each vessel extends upwardly to the drainage shelf 30. (See FIGS. 3 and 4).

The rear end wall 42 of each vessel has an aperture or opening through which a tube or conduit forming the oil distributor is passed, and means (not shown) are provided to seal the end wall around the distributor to prevent leakage. Also, it will be seen that the extension of the bottom portion of the vessels is higher outboard than inboard so that the overflow device 34 is lower than drainage shelf 30, which is inclined in order to provide for drainage of hot cooking oil which may drip onto the shelf as the comestibles are being prepared for use, and provides for a weir flow for the overflowing of the cooking oil from the vessels during cooking. The bottom portions 40 of the cooking vessels each also defines an oil drain hole 46 for bleeding off a small quantity of oil from near the bottom of the oil forming the bath in the vessels during and after cooking and the drain hole has a drain screen 48 positioned in it to prevent clogging.

The oil overflow device 34 is positioned longitudinally between the cooking vessels, extending between them to connect at one end with the rear end walls 42 and at the other end with front end walls 44. The oil overflow device is of V shaped cross-section and positioned between the cooking vessels or receptacles so that the tops of the V form a weir or overflow means 50 with each vessel for cooking oil spillover. The V formed by the two weirs provides a trough-like housing 52 closed at front and rear by housing ends 53 and 54 and which provides a housing adapted to retain a removable filter 56 for filtering the oil spilling into the overflow device. The top portion of the housing defines an opening 58 which is supported in such a way as to allow the oil overflowing the weirs to substantially fill the housing and pass through the filter to filter out and retain particles of comestible from the cooking oil.

Positioned near the level of the oil in housing 52 in one of the housing ends and behind the filter is an oil return aperture 59 that is connected to oil return conduit 60 which extends into an oil reservoir or tank 62 for passage of filtered oil from the overflow device to the reservoir when the cooking operation is in progress. The oil level during cooking is designated by dash line A in FIG. 3. The reservoir 62 is positioned below the bottom of the housing so that oil passing through the filter returns by gravity flow to the reservoir. A small oil bleed aperture 63 is also defined in the bottom of the housing and is connected with the reservoir by bleed line 64. This arrangement provides a drain or bleed-off flow of oil from the lower portion of the housing into the reservoir during cooking and to empty oil out of the housing after cooking is completed.

The drainage of cooking oil from the bottom of vessels 32 through drain hole 46 and screen 48 is also passed to reservoir 62 through drain lines 65. These lines are of a size so as to permit a continuous controlled amount of drainage of oil from the vessels into the reservoir during the cooking operation, and the screens 48 keep loose pieces of comestibles that may be on the bottom of the vessels from exiting through these drain holes. When the cooking operation is stopped, the oil drains completely from the cooking vessels and is deposited by gravity in the heated reservoir and the oil level then is at B as is illustrated by dash line in FIG. 3.

The return conduit 60 extends into the reservoir and its exit end is positioned below the oil level A and above a pair of oil heaters 66 and 68 located in the reservoir. Positioned below the exit end of conduit 60 above the heaters is a dished baffle deflector 69 which intercepts the entering flow of oil moving downward from the conduit into the oil supply in the reservoir and provides for deflecting this flow upward from just below the level of the oil supply and directing it towards the surface of the oil so that gases entrained in the oil can separate out and water pass off as vapor or steam and be released from the surface of the oil. A vent 70 is provided on the reservoir for venting any air or steam from it so as to prevent cavitation and loss of pump suction during circulation of the oil in the system.

The oil reservoir 62 has an enlarged upper crosssection that provides space for holding the cooking oil when the unit is not in operation and for a change of its level when the circulation of the oil takes place during cooking. Below the enlarged upper cross-section is a smaller cross-section which provides a well or sump in which electrical heaters 66 and 68 are positioned. It is appreciated that other types of heaters may be used and that the heating of the reservoir can be accomplished by a jacketed heating means surrounding it. In order to provide efficient heating of the oil in the sump, two baffles 71 and 72 are arranged so as to allow for distributing of the oil normal to its flow direction, thus providing more efficient heating of it. The lower section of the reservoir near the bottom thereof has an outlet opening 74 which provides for the passage of oil from the reservoir during cooking.

An oil pump 76, which preferably may be a positive displacement type pump, is energized by motor 78 and is operatively connected at its intake end to reservoir 62 and at its discharge end to conduits that feed oil distributors 80. The intake end of the pump is connected to outlet opening 74 by conduit 82 and the discharge side of the pump is connected to conduit 84, which in turn is connected to header conduit 86, which is connected to distributor feed pipes 88. The feed pipes 88 are connected to their oil distributors 80. In this arrangement, the pump sucks oil from the bottom section of the reservoir and passes it through the conduit header and feed pipes into the oil distributors so as to produce within the cooking vessels a turbulent, continuous flowing of oil around and through the comestibles being cooked, where it then overflows and is filtered and returned to the reservoir for recycling to the cooking vessels (see FIGS. 3, 4 and 5).

The reservoir has a draining valve 89 in the bottom of it for replacing the cooking oil when the oil needs to be changed. Also, the cooking oil overflow device 34 is provided with a cover 90 that covers the opening in the overflow device and prevents food or other particles from falling into the device. The cover also aids in the control of the flow of the cooking oil over the weir by having the oil flow under the bottom edge of it, thus helping to provide a smooth overflow.

Exemplary of a suitable portable unit for "deep-fat" cooking using standard open mesh cooking baskets is a unit having one or more deep rounded bottom cooking vessels. It has been found that very good results can be obtained when the cooking vessels have a length from about 10 inches to about 20 inches, a width of about 6 inches to about 10 inches and a depth of about 4 inches to about 8 inches, it being appreciated that larger vessels can also be used. The cooking medium in the unit can be maintained at a temperature of from about 300° to about 390°F., with a circulation rate of from 2 to 20 gallons a minute and a cooking medium capacity of 2 to 10 gallons in the total system. A portable unit of the type set forth above cooked such items as potatoes, clams, chicken, fish, meat, shrimp and other fryable food in a minimum of cooking time with the elimination of scorching and the accumulation of charred food particles in the vessel so that the resultant cooked product was free from odors. This occured even when different fryable foods were cooked in the same medium.

An instrument or control panel 100 is provided at the front of the "deep-fat" frying unit 10 for housing control switches and operating lights used in the operation of the frying unit. Controls for the pump, heaters and other parts of the electrical system include switch 104, which energizes the electrical system, and a pump motor relay switch 106 that energizes the motor 78 through its relay 107. Switch 104 energizes signal light 108 which signals an "on" or "off" condition of the unit. Switches 104 and 106 are connected across a source (not shown) of 117 volt A.C. power, with the motor switch providing hand control operation of the oil pump motor 78. Also operatively connected across the 117 volt A.C. power source is a manually controlled oil heater switch 110 for placing the heater in condition of being electrically energized. The heater and its switch is connected to a heater pilot light 112 to signal when the heaters are in operation. Heater elements 92 are controlled by a heater relay 114 housed in a contactor box 116, the relay connected so that the heaters are in parallel across a source (not shown) of 240 volt three-phase A.C. power. A heater terminal box 118 is provided for connecting the heaters with the heater relay.

An oil temperature control thermostat 120 can be set by a calibrated knot or other suitable mechanism (not shown) so as to set the output of the heaters to maintain the cooking oil at the desired temperature. A temperature control and sensing probe 122 is positioned in the return flow of oil from the overflow means and controls thermostat 120 to maintain the desired cooking temperature of the oil in the reservoir. The thermostat 120, in association with pilot light 112 which signals when the heaters are in operation, are connected across the 117 volt A.C. power source controling energy to heater elements 92 in the heaters 66 and 68, through thermal relay 114.

An overheat thermostat 124 has a temperature sensing probe (not shown) attached to the outer surface of the reservoir which controls the operation of it. The overheat thermostat 124 provides a "lock-out" of the electrical system when oil in the reservoir is heated above the desired set cooking temperature. When this occurs, a signal light 128 shows that the heater operation is locked-out, thus protecting the cooking oil from overheat damage.

A low oil level safety device 130 is located in the oil reservoir 62 and has a cut-out switch 132. The safety device 130 provides a cut-out means which disconnects the power to the pump motor shutting down the circulation of oil in the unit and deenergizing the heaters when the level of cooking oil in the reservoir falls below level A. The safety device 130 is operated by a float 134 which floats on the surface of the oil in the reservoir and is attached to the end of a lever 134 that extends through a seal in an opening through the side of the switch housing 138 and is fulcrumed to operate the safety switch 132.

An open condition of the switch 132 disconnects power to the electrical system except that it energizes signal light 140 that indicates that oil should be added. A preheat thermostat 142 is provided for holding the pump out of operation until the oil has been heated to the desired cooking temperature.

When the unit is not in use, or after the cooking operation has been completed, each basket is placed on its hanger bracket support 35 and maintains a pump hold out switch 144, connected into the controls for the unit, in position so that no energy is produced for the pump motor. There is a time-delay mechanism operatively associated with the switches 144 so that, when the baskets are in place on the brackets, the pump is permitted to operate only for a short period of time to insure that the oil in the vessels is cleaned by passage through the filter.

In operation, the "deep-fat" fry unit of this invention is first supplied with a cooking means, such as oil or fat. The oil or fat necessary to fill reservoir 62 to level B as shown in FIG. 3 provides sufficient oil for the operation of the unit. The oil can be put in the reservoir by removing cover 90 and then pouring it into the overflow device 34 where it passes into the reservoir until level B is reached. Level B is reached by pouring in the amount of oil that is designated as the capacity for the unit. With the oil in the unit at level B, one of the frying baskets is removed from its bracket support 35, allowing the hold-out switch 144 to close so that the system may be energized. Then the main switch 104 is turned on, energizing the system, and the oil heater switch 110 is turned on and the heaters 66 and 68 are energized. At this point, the heater pilot light 112 is energized, showing that the cooking oil is being heated. When the oil is at the proper temperature to insure that it is fluid and pumpable, the thermostat 142 energizes the relays 114 and 107, allowing the pump to start circulating the oil. The oil continues to heat until the oil temperature control thermostat 120 registers the pre-selected cooking temperature at which point it de-energizes, allowing energy to flow to the relay 114, thereby dropping the heaters out while the pump continues to circulate. The cooking basket may then be replaced on its bracket support 35 which shuts off the pump after a time-delay. The "deep-fat" frying unit is then ready for cooking operation and, with cooking baskets 36 positioned on hanger bracket supports 35, the pump relay motor switch 106 having been placed in the "on" position by hand the pump is prevented from operating by pump hold-out switches 144 which hold the pump motor inoperative until a basket is removed from its bracket support.

When the unit is to be operated, comestibles are placed in the baskets and one or both of the baskets removed from their bracket support and placed in the circulating oil in the vessel. Removal of one of the baskets allows the pump to operate by energizing the pump motor 78 so that the pump 76 can circulate hot cooking oil through the cooking vessels. At this point, signal light 108 is energized, showing that the unit is in operation. By submerging one of the baskets with comestibles in it in the vessel, cooking can then take place. After the comestibles in the basket are cooked and the basket removed and placed back on the hanger support bracket 35, when both baskets are on their supports, the pump hold-out switches 144 stop the pump 76 after a short delay, which may be from about 0.5 minutes to about 2 minutes, or longer if necessary, to clear the oil of any loose particles by continuing its circulation through the filter.

The bottom of each cooking vessel has a drain line 65 in it for continuously removing a small quantity of cooking oil from the bottom of the cooking vessel. It will be appreciated that the quantity of cooking oil being circulated may be sufficient to provide turbulence and a sweeping flow by jet stream action directed downwardly and outwardly so that the hot, fresh, filtered oil passes through and around the comestibles being cooked and then over the weir 50 and draining of a small quantity of cooking oil from the bottom of the vessel. After the cooking operation has been stopped, the cooking oil remaining in the vessel slowly drains from it. The drained oil from the vessels returns to the reservoir to remain there in heated condition ready for use. This draining of the vessels prevents oil from being exposed to the atmosphere and reduces the absorption of oxygen and contaminates in it. Where a semi-continuous operation is used and the oil in the reservoir drops below a predetermined lower level due to absorption by the comestibles of the cooking oil, a cut-out switch 132 deenergizes both the heaters and pump motor and deenergizes the signal light 108 and energizes the signal light 140 showing that oil needs to be added to that in the reservoir. The controlling of the desired cooking temperatures for the cooking operation is accomplished by thermostat 120 and overheat thermostat 124, which latter provides for a shut-down of the unit when the cooking oil rises above the maximum allowable temperature. When additional oil is needed it may be added through the overflow device so as to bring the oil level in the reservoir to the proper level by removing cover 90 and pouring a measured quantity of oil into the overflow device 34. This adding of a measured quantity of oil brings the oil in the reservoir to level B which provides sufficient oil for proper circulation during the cooking operation.

When the cooking oil in the unit, because of long use needs to be changed, it can be drained from the reservoir through the reservoir drain 89 at which time the unit can be cleaned and fresh oil placed in the reservoir.

In an alternate embodiment, the electrical system utilizes the same components and circuiting of FIG. 6 operating in the same way as heretofore described for the prior embodiment, except that the pump hold-out switches 144 are not included so that pump operation is not switch controlled by the baskets. Thus, with sufficient oil in the system as described above, the double pole switch 104 is closed, connecting power to the whole unit. Oil heater switch 110 is then closed, which energizes the automatic circuit to both heaters and pump, the latter also controllable by manual switch 106 which is then placed at "on" or closed position. If the oil level is sufficiently high in the reservoir, that is, not significantly below level A, then cut-out switch 132 is closed by operation of its actuating float, thus activating the circuit to thermostats 120, 124 and 142. Preheat thermostat 142, especially advantageous when hard fat is used which solidifies when cold, disconnects through relay 107 the pump only and not the heaters, until the temperature of the fat has risen sufficiently so that it is molten, when the thermostat then energizes the relay allowing the pump to circulate the fat. The pump continues to circulate the fat and the heaters continue to heat the fat until the correct temperature is reached, and then control thermostat 120 de-energizes and cuts off the energy to the heater relays 114, shutting off the heat, but allowing the pump to continue operation. If, for any reason, for example, breakage or damage to a switch, the heaters continue to heat the oil, then the overheat thermostat 124 acts as an emergency back-up for control thermostat 120 and shuts the heaters off when the temperature of the oil reaches above the predetermined maximum safe limit.

It will be appreciated that the cut-out switch 132 is set to de-energize the whole electrical circuit if the level of oil or fat drops to a certain pre-selected level below level A. It will be observed that, when the cooking vessels are full, the operating level in the reservoir during cooking is at its lowest. Thus, when a too low level of oil causes the pump to shut down, oil starts to drain from the cooking vessels back through lines 65 which raises the oil level in the reservoir. This higher level raises the float 134, again closing the cut-out switch 132 which starts the pump, causing it to pump oil out of the reservoir and to the cooking vessels. This action drops the oil level in the reservoir, causing the float, when the oil reaches below level A, to fall opening the cut-out switch 132, which again stops the pump. In this way, when the quantity of oil in the system is too low, cut-out switch 132 is cycled between open and closed condition so that signal light 140 blinks on and off to attract attention to the low oil condition in the system.

Further, when the filter 56 begins to become clogged with overflowed food particles, cooking oil flows into the cooking vessels faster than it can drain and flow out through the clogged filter and back to the reservoir. In a manner similar to that just described when system oil quantity is insufficient, this causes rising and falling of the float as the oil level fluctuates above level A and the float alternately opens and closes cut-out switch 132, which starts and stops the machine and the pump, so that signal light 140 flashes on and off to call attention to the need to clean the filter.

It will be appreciated that the "deep-fat" frying unit of this invention provides for an easy and simplified method for keeping it clean since the filter 56 can be simply and easily taken out and cleaned. Also, the tray 12, which supports the cooking vessels 32, can be made removable so that it can be detached from the unit and easily cleaned.

The apparatus of this invention may be used in both large scale operations for either semi-continuous or continuous "deep-fat" frying, and for small scale intermittent operations such as individual basket "deep-fat" frying. Because of the portability that the smaller unit has, it is particularly adapted for small restaurant kitchens where large quantities of "deep-fat" fried foods must be processed in a short period of time during rush periods, and where the quality of the comestibles must be such as to give a commercial advantage. The cooked comestible formed by the apparatus of this invention is one that gives a commercial advantage in that it has a lower oil or fat consumption and thus provides a new and novel "deep-fat" fried comestible.

It has been found that the apparatus of this invention produces a "deep-fat" fried comestible product with an extremely low cooking medium absorption by weight of product. This is particularly advantageous where large quantities of foods are to be fried, such as breaded chicken, seafood and other food products where cooking medium absorption is both important to taste and to crispness. In the field of French fried potatoes, a low cooking medium absorption is at all times desirable since this, too, adds to improved taste and crispness of the potato pieces. Because most of the food products being "deep-fat" fried today in restaurant kitchens are in a frozen or semi-frozen state, it is important that good heat transfer be provided when the comestible is being cooked so that the cooking time is lowered and the absorption of the fat reduced. This is brought about in this invention by the continuous flushing of the comestibles with filtered hot cooking medium in order to produce a cooked product with a minimum of absorption.

An example of the low cooking medium absorption of this invention is shown in the following example. Using the fryer unit described above, 200 pounds of frozen comestibles were fried in a period of 5 hours. The fryer contained 50 pounds of heated solid shortening that was continuously circulated during frying. The frozen comestibles consisted of:

140 pounds of chicken pieces
30 pounds of flounder fillets
30 pounds of potatoes.

These comestibles in an open mesh basket were immersed in the circulating fat maintained at a temperature of approximately 330° F. During the cooking, a 60-mesh stainless steel filter screen was filled four times to a point where it impeded the flow of fat overflowing from the cooking vessel. Each time the filter screen was removed and a clean filter screen was put in its place without stopping the operation of the fryer.

At the completion of the run, the fat remaining in the fryer was drained and weighed and it was found that the comestibles had absorbed approximately 8 percent of the fat. Also, the fat was found to be clear and bright and free of any rancid odor or taste.

It will be appreciated that the apparatus of this invention provides for the "deep-fat" frying of comestibles in a more efficient manner with the result that an improved product is obtained. This is because of the following:

1. Shorter Cooking Time — The cooking vessel of this invention is made relatively small and the distributions are aimed in such a way as to cause a strong flow over and around the comestible contained in the cooking basket. This strong flow prevents fat or oil from congealing on the comestible, particularly when the comestible is put into the vessel in a frozen condition. The improvement in heat transfer which results from the flushing action of the fat or oil considerably reduces the time required to cook the comestible.

2. Lower Cooking Temperatures — The same flushing action which shortens the cooking time because of better heat transfer also allows a reduction in the temperature of the fat or oil. As frying is carried out at a temperature high enough to damage the fat or oil, a reduction of oil temperature helps to preserve the quality of the fat or oil. Further with comestibles such as chicken pieces, where the single article has a high weight and large cross section, it has been observed that if too high a fat or oil temperature is used the outer part of the chicken is burned or over-cooked before the center of the chicken is cooked.

3. Heavy Loading — The same quantity of fat or oil in the cooking vessel insures rapid replacement of the fat or oil which has given up its heat to the comestible with freshly heated fat or oil. The size of the load can therefore be made as high as the capacity of the heaters will allow.

4. Quick Heat Recovery — The same flushing action of the fat or oil over the comestible which improves the rate at which the fat or oil gives up its heat to the comestible works in improving the heat transfer as the cooled fat or oil returning from the cooking vessel is made to pass over the heating units in the reservoir.

5. Low Fat Absorption — In the usual "deep-fat" fryer the cold comestible to be cooked is immersed into a bath of non-flushing hot fat or oil. The hot fat or oil immediately surrounding the comestible rapidly loses its heat and is increased in viscosity and clings to the cold comestible in a layer of partially congealed fat or oil which in addition acts as an insulation as well as adding to the amount of fat or oil absorbed by the comestible.

It will be appreciated that the drain line connecting the bottom of the cooking vessel with the reservoir may be of a diameter sufficient to allow a slow bleeding of cooking medium from the bottom of the vessel during the cooking operation with the recirculation being sufficient to maintain the level in the vessel high enough to produce a substantially constant overflow and when the circulation of the cooking medium is discontinued to drain the medium from the vessel into the reservoir. Also the drain lines may have a valve means in it to adjust the degree of drainage and thereby adjust the time required to empty the cooking vessel when the cooking operation is discontinued.

In the "deep-fat" fryer of this invention, any type of "deep-fat" cooking medium may be used, such as solid shortening, oil and the like. The apparatus is particularly adapted to handle a fat that solidifies on cooling since when the cooking process is not in operation the hot fat drains into the reservoir before it can solidify where it is maintained in a liquid state ready for use.

Another advantage of the "deep-fat" fryer of this invention is that steam, air or other fluids entrained in the cooking medium during cooking, can be removed from the cooking medium in the reservoir and released to atmosphere through the vent 70 thereby providing an atmospheric head above the level of the medium in the reservoir and preventing cavitation due to expanding gases at the pump inlet. This vent also insures that pressure heads due to high temperature and moisture cannot occur.

It will be appreciated that additional heating elements can be placed in the system as for example in and around the reservoir for easy start-up if desired. It will also be appreciated that other means of heating, such as gas heated tubes or coils containing a heating substance, can be used.

Any type of filters may be used for removing the food particles from the overflowing cooking medium. These may be of the disposable types, reusable types, and made of any suitable material; such as, stainless steel, matted fibers or the like. Also, while a positive displacement oil circulating pump of the gear type has been found to produce good results, it will be appreciated that other types of pumps may be used that are capable of maintaining a continuous circulation of cooking medium during the cooking operation.

While the invention has been described with particular reference to a preferred embodiment thereof, it will be obvious to those skilled in the art that various changes and modifications may be made without departing from the spirit and scope of the invention.

What is claimed is:

1. An apparatus for preparing cooked comestibles by immersion in hot cooking medium which comprises a housing; at least two cooking vessels supported in said housing maintained at atmospheric pressure for holding a body of hot cooking medium and comestible when immersed in it and heated oil distributor means positioned in said vessels, said vessels shaped to produce controlled and directed streams of the hot cooking medium from said distributor means to create turbulent conditions therein to effect good heat exchange and thereby increase cooking speed and prevent settling out in the vessels of small detached particles of comestibles; an overflow means positioned contiguous said cooking vessels; a reservoir operatively connected to said overflow means maintained at atmospheric pressure to contain excess of cooking medium over that required to fill the cooking vessels; filter means positioned between said overflow means and said reservoir for removing loose particles of the comestibles from the cooking medium; circulating means operatively connecting said reservoir and said distributor means for maintaining a flow of cooking medium through and around the comestible in the cooking vessels and into the overflow means to supply loss of cooking medium taken up by the comestible during cooking; and heating means for maintaining the cooking medium at a predetermined cooking temperature before its passage into said cooking vessels.

2. The apparatus of claim 1 in which said circulating means has control means that is responsive to the level of the medium in the reservoir so that when it drops to a predetermined lower limit circulation of said heated cooking medium and said heating of it stops.

3. The apparatus of claim 1 in which the cooking medium overflow means separates the cooking vessels.

4. The apparatus of claim 1 in which said overflow means is a weir maintained at a lower level than that of the cooking medium in the vessels.

5. The apparatus of claim 1 in which said overflow means is a trough for supporting the filter with a supply of cooking medium in it, having a level higher than an exit opening behind the filtering means for conveying overflowing oil after passage through the filter into the reservoir.

6. The apparatus of claim 1 in which said overflow means has a removable cover that is positionable over the overflow and raised to permit cooking medium to flow under the bottom edges of it into said overflow means.

7. The apparatus of claim 1 in which said filter means is removable from said overflow means for cleaning.

8. The apparatus of claim 1 in which said reservoir has a vent means to release the accumulation of any air or steam from the cooking medium in said reservoir.

9. The apparatus of claim 1 in which said heating means is positioned in said reservoir for maintaining the cooking medium in said reservoir at the desired cooking temperature.

10. The apparatus of claim 9 in which baffle means is positioned in said reservoir adjacent to said heater means to distribute the medium substantially evenly about the heaters during passage of the medium to said circulating means.

11. The apparatus of claim 1 in which the overflow means extends into said reservoir below a minimum level of the medium therein.

12. The apparatus of claim 11 in which a dish-shaped baffle is positioned below the oil exit end of a conduit extending from the overflow means for deflecting circulating medium upward towards the level of the medium.

13. The apparatus of claim 1 in which the circulation means is a positive displacement pump for supplying said distributor means with cooking medium during cooking of comestibles.

14. The apparatus of claim 1 in which said distributor means has a plurality of orifices positioned in each of said vessels direct incoming heated cooking medium from said circulating means in a sweeping and turbulent manner through and around immersed comestibles to sweep loose particles of comestibles into said filter in said overflow means.

15. The apparatus of claim 14 in which said orifices are downwardly and outwardly directed and positioned in an elongated cooking medium feed tube located at the one side of the said vessel opposite to said overflow means.

16. The apparatus of claim 1 in which each of said cooking vessels has attached to it a cooking medium drain tray with cooking basket support means for suspending a cooking basket after cooking is completed above the level of cooking medium in the vessel to permit drainage of the cooked comestible.

17. The apparatus of claim 16 in which said cooking basket support means has switch means operatively connected between it and the circulating means so that the heated cooking medium is circulated when the cooking baskets are removed from the support means and stopped when positioned on the support means.

18. The apparatus of claim 1 in which said housing has wheels attached to the bottom of it to provide portability to the apparatus.

19. The apparatus of claim 1 in which a temperature sensing means is positioned in the overflow means to sense the temperature of the medium returning to the reservoir and to activate the heater means to heat the medium in the reservoir when the temperature of the incoming medium drops below a predetermined temperature.

20. The apparatus of claim 1 in which each of said cooking vessels has a curved bottom to effect a sweeping action of the medium around and through the comestibles placed in the vessel and then into said overflow means.

21. The apparatus of claim 1 in which the bottom of each of said cooking vessels has drain means therein for draining a small quantity of said cooking medium into said reservoir so that, when the circulating means is not in operation, cooking medium is drained into said reservoir to maintain the cooking medium in a heated state.

22. The apparatus of claim 21 in which screen means is positioned in said drain means.

23. The apparatus of claim 1 in which said circulating means and said heating means are operatively connected to a control means, said control means automatically stopping operation of the circulating means and the heating means when the cooking medium in the reservoir is below a lower limit and then energizing a signal to report that the unit is inoperative.

* * * * *